(No Model.) 2 Sheets—Sheet 1.

E. C. WESTERVELT & C. W. CLAPP.
SULKY PLOW.

No. 526,983. Patented Oct. 2, 1894.

Witnesses
M. E. Taylor
James R. Mansfield

Inventors
Edmund C. Westervelt
and Charles W. Clapp
by Alexander + Dowell
Attorneys (No Model.) 2 Sheets—Sheet 2.
E. C. WESTERVELT & C. W. CLAPP.
SULKY PLOW.
No. 526,983. Patented Oct. 2, 1894.
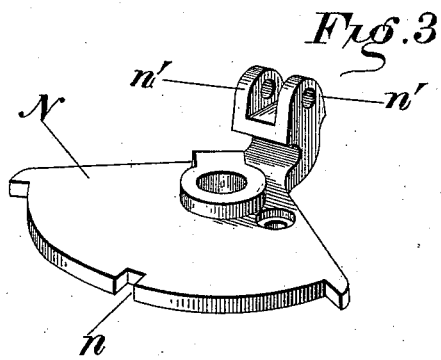
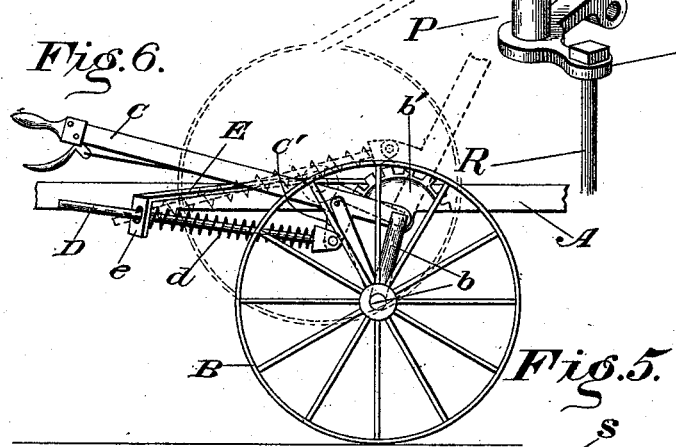
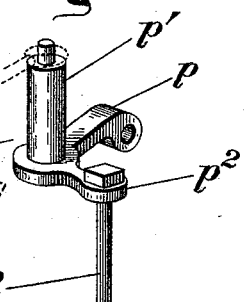
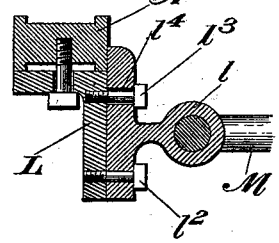
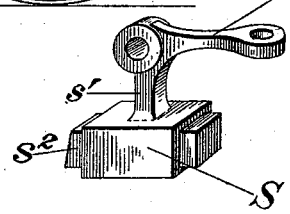
Witnesses:
M. E. Fowler
James R. Mansfield
Inventors
Edmund C. Westervelt
and Charles W. Clapp
by Alexander Howell
Attorneys.

UNITED STATES PATENT OFFICE.

EDMUND C. WESTERVELT AND CHARLES W. CLAPP, OF SOUTH BEND, INDIANA.

SULKY-PLOW.

SPECIFICATION forming part of Letters Patent No. 526,983, dated October 2, 1894.

Application filed December 23, 1893. Serial No. 494,544. (No model.)

*To all whom it may concern:*

Be it known that we, EDMUND C. WESTERVELT and CHARLES W. CLAPP, of South Bend, in the county of St. Joseph, and State of Indiana, have invented certain new and useful Improvements in Sulky Plows; and we do hereby declare that the following is a full, clear, and exact description thereof, reference being had to the accompanying drawings, and to the letters of reference marked thereon, which form part of this specification.

This invention is an improvement in sulky plows, and its objects are, first to provide novel means for facilitating the raising and lowering of the land and furrow wheels, or lessening the manual labor ordinarily required for such operations; and second to provide a novel brake mechanism for the rear-caster wheel, which can be operated at any time regardless of the position of the caster wheel in relation to the plow, $i.$ $e.$, whether such caster wheel be in line therewith or at an angle thereto.

The invention therefore consists in the novel means for accomplishing the aforesaid objects, as summarized in the appended claims, and described in detail as follows, reference being had to the accompanying drawings by letters of reference marked thereon.

Figure 1:
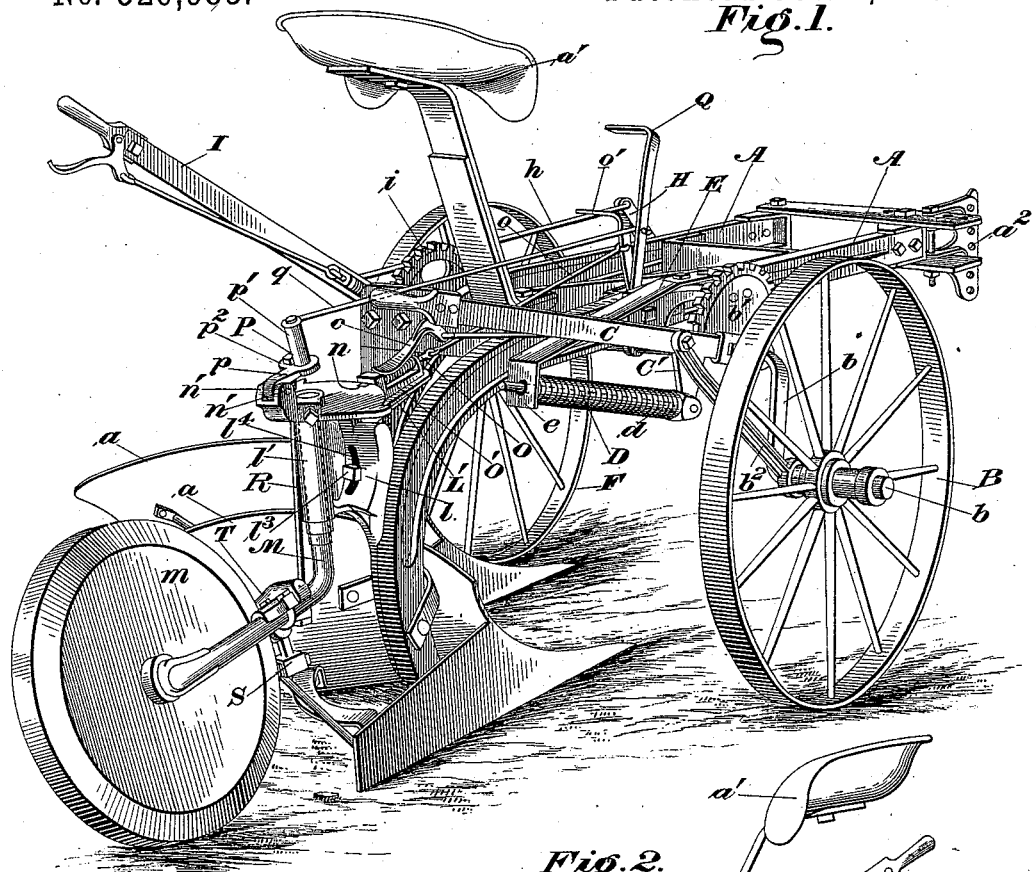
Figure 2:
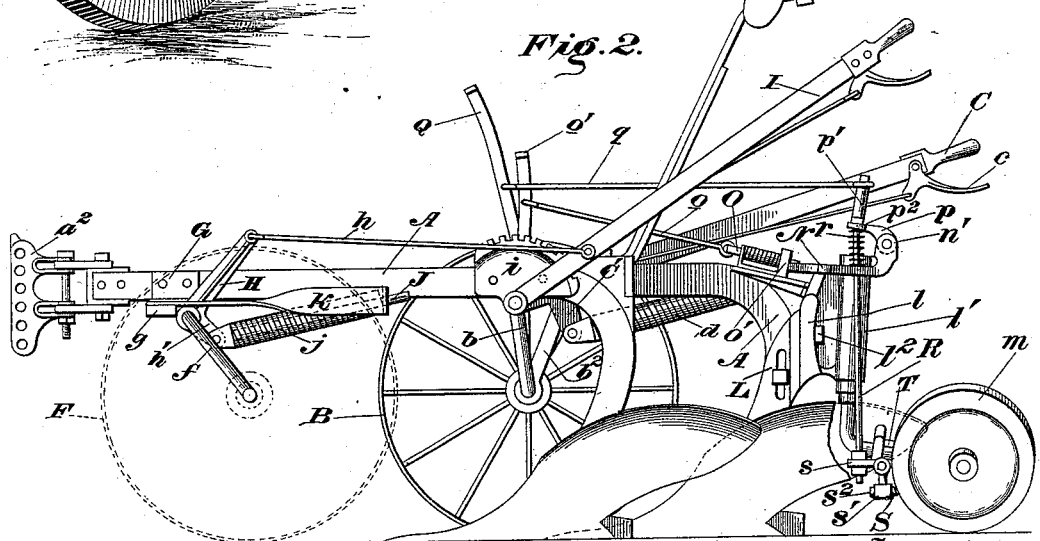

Figure 1 represents a perspective view of a double gang sulky plow embodying our improvements, seen from the rear land side. Fig. 2 is a side elevation of the furrow-side of the same. Figs. 3, 4 and 5 are details of the caster-wheel brake mechanism. Fig. 6 is a detail view of the furrow wheel adjusting mechanism indicating the operation of the spring in raising and lowering said wheel by the aid of dotted lines. Fig. 7 is a detail transverse sectional view of the caster wheel carrying devices.

Referring to the drawings by letter, A, A, designate the plow beams, arranged parallel and rigidly connected together by suitable tie bars and braces, so as to constitute a rigid frame; $a$, $a$, are the plows proper attached to the beams, $a'$ is the driver's seat, and $a^2$ is the clevis attached to the front end of the frame all arranged as may be desired, and as shown, like a well known construction of gang sulky plow.

The land wheel B is mounted on a cranked axle $b$ journaled in suitable bearings formed in castings secured to the beam of the rear plow, or frame, in any suitable manner. To the upper horizontal portion of axle $b$ is rigidly secured a hand lever C, provided with an ordinary hand latch $c$, adapted to engage with a segment $b'$ rigidly secured to the beam or frame beside the axle, by which means the land wheel can be adjusted and locked in the desired position as usual.

$b^2$ is a brace connecting the lower spindle portion of the axle $b$, to lever C as shown to prevent movement of the lever independently of the land wheel spindle.

The lever C is provided with a short depending arm C' near the axle, to which arm is pivoted the forward end of a rod D, the rear end of which extends through an opening in the downwardly bent end $e$, of a bar E, the front end of which is rigidly secured to the beam, or frame, near the axle, or at other convenient point. An expansion coil spring $d$ is strung on rod D, intermediate the end $e$, and arm C', as shown. The opening through end $e$ of bar E is about horizontally in line with the upper portion of axle $b$. Now if the lever C be raised, thereby raising the land-wheel, it forces rod D backward, compressing spring $d$ until the pivotal connection of the rod and arm, is in line with the opening through bar E and the connection between lever C and the axle when a further raising, or forward movement, of lever C brings the connection between rod D and arm C' above the dead center, and the expansive force of the spring is immediately exerted to throw the lever farther forward, thereby facilitating and assisting in the raising of the land wheel.

When it is desired to lower the land wheel lever C is drawn backward, thereby compressing spring D, until the connection between rod D and arm C', passes below the dead-center, when the expansive power of the spring is immediately exerted to assist the lowering of the land wheel.

From the foregoing it will be readily understood how the single spring assists in both the raising and lowering of the wheel, and consequently lessens the manual labor required in ordinary constructions for effecting these operations, as the compression of the spring is effected when the lever C is in a position to be most effectually shifted by the driver with least exertion.

The furrow wheel F is mounted on a cranked axle $f$, of ordinary construction, and is journaled in bearings on the frame, or as shown, in a casting G bolted to the front plow beam, or furrow side plow beam. On axle $f$ is fixed a bell-crank lever H, the upper and longer arm of which is connected by a rod $h$ with a hand lever I pivoted to a segment casting $i$ secured to the beam in rear of casting G, in convenient reach of the driver, said lever being provided with an ordinary hand-latch adapted to engage the segment and lock the lever, and consequently the furrow wheel, in any position desired. To the shorter arm $h$ of crank H is pivotally connected one end of a rod J the rear end of which extends through an opening in the laterally bent end of a bar K the front end of which is attached to a laterally projecting portion $g$, of casting G, and an expansion spring $j$ is strung on rod J intermediate the arm $h$ and the perforated end of bar K. The function of the spring $j$ and the operation thereof and the connected parts are identical with the function of spring $d$ and its connected parts; the latter assisting in the raising and lowering of the land wheel, as above described, and the former assisting in the same manner in the raising and lowering of the furrow wheel, as will be readily comprehended.

The double acting spring for the purpose described forms an essential feature of our present invention, and it is applicable to any plow employing either a land or furrow wheel, or both, mounted on a cranked axle or swung upon a fulcrum, and is not limited to its use in connection with the double gang plow shown in the drawings.

To side of the land side plow beam, just above the plow, is bolted a bracket L, the securing bolts passing through a vertical slot or slots in the bracket to permit vertical adjustment of the latter. The rear face of the bracket is plane surfaced and substantially vertical, and thereto is adjustably secured a caster wheel holder casting $l$, having a substantially vertical sleeve portion $l'$ and a lateral web portion which fits against the rear face of bracket L, and is secured thereto by means of bolts $l^2$, $l^3$, the former passing through a circular opening, and the latter through an arc-shaped slot $l^4$ in the web portion. The object of this double fastening is to allow lateral adjustment of the caster wheel as hereinafter described.

In sleeve $l'$ is journaled the vertical portion of a bell cranked shaft M to the rear end of the horizontal arm of which is secured a caster wheel $m$, which runs parallel with the horizontal arm, and is inclined toward the furrow side, as in ordinary construction. Now if bolt $l^2 l^3$ be unscrewed slightly it is evident that the entire caster holder $l$, with the caster wheel can be swung on the bolt $l^2$ as a center, so far as slot $l^4$ will allow it. Thus the caster wheel can be adjusted in or out so that it will set exactly into the corner of the furrow as it lifts the landside. As bracket L is also vertically adjustable it is evident that the caster wheel can be adjusted both laterally and vertically, and therefore can be set to accommodate any kind of landside or plow bottom. This being highly desirable, as when chilled bottoms are used instead of steel bottoms (the former being much thicker than the latter) it is necessary to adjust the furrow wheel both laterally and vertically in order to cause it to run closely in the corner of the furrow.

On the upper end of shaft M, above the bracket is rigidly secured a segment-shaped casting N, having a central notch $n$ in its front edge which is engaged by a spring-controlled bolt O secured in a keeper O' on a forwardly extending arm L' of the bracket L, the bolt being disengaged by means of a rod $o$ by which it is connected to a foot lever $o'$ pivoted to the frame conveniently near the driver's seat as shown. When the bolt O engages the notch the caster wheel is locked in position behind and in line with the plow.

P designates a bell crank lever having its horizontal arm $p$ pivoted between ears $n'$, on the rear edge of the segment N directly opposite the notch $n$. The vertical arm $p'$ of this lever stands directly over the end of, and in line with, the vertical portion of shaft M, and therefore always remains in line with said shaft, no matter to what position the caster wheel may turn, as the bell crank turns with the shaft. The upper end of arm $p'$ is connected by a rod $q$ to a foot lever Q pivoted beside lever $o'$, in such manner that the driver can easily, if he desires, operate both levers with one foot, and simultaneously. The connection between the arm $p'$ and rod $q$ is such that the arm can turn freely, with the shaft M, without twisting or straining itself or the rod.

Lever P is provided with a lateral projection $p^2$ at its bend to which is secured the upper end of a rod R, which depends through an opening in segment N, beside the sleeve $l$, and has its lower end connected to the forwardly projecting arm $s$, of a bell crank S, the end of the other arm $s'$ thereof carrying a brake shoe or rubber $s^2$. This bell crank S is hung upon a bracket T, bolted to the horizontal portion of shaft M just in front of the caster wheel, in such position that the brake shoe lies normally close to the periphery of the caster wheel. A coiled spring $r$, strung on the rod R intermediate of the projection $p^2$ and the top of segment N, serves to normally lift the bell crank P, and rod R, thereby holding the brake-shoe out of contact with the caster wheel. When lever Q is pushed forward it rocks the bell crank P, and through rod R applies the brake to the caster wheel, as will be readily understood from the drawings, and owing to the relation of the vertical arm of crank P with the vertical portion of the main shaft, the brake can be applied at any time, in any position of the caster wheel, whether the bolt O is disengaged from segment N or not. It will be obvious that this brake may be applied to any plow using a caster wheel, or wheel-land-side.

Having thus described our invention, what we claim as new, and desire to secure by Letters Patent, is—

1. The combination of the plow, the cranked axle carrying a wheel, and the lever and segment for rocking said axle, said lever having a short arm at right angles to its main portion near the axle; with the rod pivoted to said short arm at one end and playing through a fixed support at its other end, and an expansion spring strung on said rod between the arm and support, all substantially as set forth.

2. The combination of the plow beam, the cranked axle, the land wheel thereon, and the lever fixed on said axle having a short arm projecting therefrom near the axle, at about right angles to the main body of the lever, with a bar attached to the beam or frame and extending in rear of said axle, a rod pivotally connected to said arm at one end and playing through an opening in the end of said bar at its other end, and an expansion spring strung on the rod between the arm and bar, and means for locking the lever, all substantially as specified.

3. The combination of the plow beam, the casting attached thereto, the crank shafts journaled in said casting, the furrow wheel mounted on said axle, the bell crank lever secured to said shaft and connections between the long arm of the lever and a hand lever, whereby the shaft can be rocked; and a double acting spring operating against the short arm of the lever, substantially as set forth.

4. The combination of the plow beam, the casting attached thereto, the crank shaft journaled in said casting, the furrow wheel mounted on said shaft, the bell crank lever secured at its bend to said shaft, and connections between the long arm of said bell crank lever and a hand lever for rotating said shaft; a rearwardly extending bar attached to said casting, a rod pivoted at one end to the short arm of the bell-crank lever and having its other end playing through an opening in the rear end of said bar, and an expansion spring strung on said rod intermediate the short arm and end of bar, substantially as and for the purpose set forth.

5. The combination of the plow, the swinging caster wheel in rear thereof, a brake for said wheel, the segment connected to the upper end of the caster-wheel carrying shaft, and means for locking said segment; with a bell crank lever pivoted on said segment having its vertical arm in line with the journal of the caster wheel support; the rod connecting said lever with the brake, and the pull rod pivotally connected to the vertical arm of the bell crank lever and to a foot lever, all substantially as described.

6. The combination of the plow, an angular caster-wheel carrying shaft connected thereto, the caster wheel on said shaft, the wheel brake mounted on the horizontal portion of said shaft, the segment secured to the vertical portion of the shaft, means for locking said segment, a bell crank lever having one arm pivoted to said segment, and its other arm upstanding in line with the vertical portion of said shaft, the connections between said lever and the brake, a spring for normally upholding said lever and withdrawing the brake, and connections between the vertical arm of the lever and a lever near the driver's seat, all substantially as described.

7. The combination of the plow, the sleeved bracket secured to the beam thereof above the plow, the crank shaft having one end journaled in said sleeve, and a caster wheel on its other end, and a caster wheel brake mounted on said shaft below the sleeve; the segment fixed to the shaft above the sleeve, the bell-crank lever pivoted on said segment, the rod connected to said lever near its bend, and to the wheel-brake, the spring for upholding said lever and withdrawing the brake, and the pull rod and connections for rocking said lever, the connections between rod and lever being in line with the vertical portion of said shaft so as to allow free swing of the caster wheel shaft without disarranging the brake mechanism thereof, all substantially as and for the purpose specified.

8. The combination of the plow, the bracket secured to the beam thereof, the cranked caster wheel shaft having its vertical arm journaled in said casting, the notched segment fixed on the upper end of said shaft, the spring actuated bolt for locking said segment, and the rod and foot lever for disengaging said bolt; with the spring controlled bell crank lever pivoted on said segment, having its vertical arm in line with the journal of the shaft, the caster-wheel brake mounted on the horizontal arm of the shaft, the rod connecting the brake with the bend of said lever, and the pull rod connecting the vertical arm of said lever with a foot lever beside the first mentioned foot lever, all constructed substantially as and for the purpose set forth.

In testimony that we claim the foregoing as our own we affix our signatures in presence of two witnesses.

EDMUND C. WESTERVELT.
CHAS. W. CLAPP.

Witnesses:
JAMES DUSHANE,
WILL G. CRABILL.